United States Patent [19]

De Benedetti

[11] Patent Number: 5,025,909
[45] Date of Patent: Jun. 25, 1991

[54] APPARATUS FOR CONTROLLING THE LAYING AND TRANSPORTATION, ON CONVEYOR BELTS, OF INDEXED WORKPIECES MANUFACTURED BY A LINE COMPRISING A PLURALITY OF AUTOMATIC MACHINES

[75] Inventor: Dario De Benedetti, Milan, Italy

[73] Assignee: Start S.r.l., Italy

[21] Appl. No.: 320,313

[22] Filed: Mar. 6, 1989

[30] Foreign Application Priority Data

Mar. 9, 1988 [IT] Italy ................................ 19711 A/88

[51] Int. Cl.$^5$ ............................................ B65G 43/00
[52] U.S. Cl. ................................. 198/341; 198/345.1; 198/463.6; 198/576
[58] Field of Search ................... 198/345, 463.4, 463.6, 198/575, 576, 341, 345.1

[56] References Cited

U.S. PATENT DOCUMENTS

| | | | |
|---|---|---|---|
| 4,088,221 | 5/1978 | Bowser | 198/463.4 |
| 4,604,704 | 8/1986 | Eaves et al. | 198/575 X |
| 4,629,058 | 12/1986 | Reissmann et al. | 198/575 X |
| 4,640,408 | 2/1987 | Eaves | 198/575 X |
| 4,676,361 | 6/1987 | Heisler | 198/463.4 X |

FOREIGN PATENT DOCUMENTS 153016 7/1987 Japan .................................. 198/575

*Primary Examiner*—Robert P. Olszewski
*Assistant Examiner*—Cheryl L. Gastineau
*Attorney, Agent, or Firm*—Basile and Hanlon

[57] ABSTRACT

This invention concerns an apparatus adapted to control both the laying and transportation, on conveyor belts, of indexed workpieces, manufactured by a line comprising a plurality of automatic machines.

The subject apparatus substantially includes a plurality of continuously operating conveyor belts, arranged sequentially to each other, among which there are provided temporary workpiece stop mechanisms. Each automatic machine is connected to the next by a continuously operated conveyor belt and one of the temporary stop mechanisms. Control is actuated by picking up, from the following machine, one of the manufacturing cycle characterizing signals thereof, which is sent to a pair of timers, wherein the first determines the temporary stop mechanism enable delay time, while the second determines the enable time duration.

The signal is sent by the following machine to the timers and by controlling the latter, it is possible to prevent that on the conveyor belt associated with the machine there arrives any workpiece manufactured by the preceding machine while the just manufactured workpieces are laid on the belt.

4 Claims, 3 Drawing Sheets

APPARATUS FOR CONTROLLING THE LAYING AND TRANSPORTATION, ON CONVEYOR BELTS, OF INDEXED WORKPIECES MANUFACTURED BY A LINE COMPRISING A PLURALITY OF AUTOMATIC MACHINES

This invention concerns an apparatus adapted to control the laying and transporation, on conveyor belts, of indexed workpieces manufactured by a line comprising a plurality of automatic machines.

Apparatus of the type mentioned above, comprising a plurality of conveyor belts, adapted to convey the workpieces manufactured by automatic machines, are already known, but they are complicated concerning both the control devices associated with the conveyor belts, and the actuation of the lines of conveyor belts when the latter are a large number.

In general, control devices such as photo-electric cells or the like are used, in order to generate stop signals for the single conveyor belts associated with each machine so that, when a machine unloads its own finished workpiece on the conveyor belt associated therewith, the latter is actuated only when the conveyor belt of the following machine is empty.

This system, in addition to being expensive, because of the control devices that have to be used, is characterized by a low workpiece handling capacity due to the frequent and long stops of the conveyor belts, and therefore it is applicable only in the case of rather long manufacturing cycles. It is substantially a low efficiency system.

In another type of line there is provided synchronization of the cycle of the control devices (through a preliminary setting of the actuation times thereof) with the machine manufacturing cycle.

But if these times have not been properly pre-set, even for very small differences, of the order of the millisecond, in a short time the pre-setting error will add up for each cycle whereby, after a reasonably non disregardable time, the workpiece lying on a conveyor belt will come to hit the one lying on the next conveyor belt. The above drawback can take place also in case of a correct pre-setting of the cycle time, which can be modified during apparatus operation, for instance because of a change in the operating conditions of the control devices.

In a further type of conventional apparatus plural lines of conveyor belts are provided for use, and they are actuated one at a time. As it is apparent, the above apparatus are extremely complicated and correspondingly require a large number of control devices, easily prone to the above drawback.

There has now been devised, and it makes the subject of this invention, an apparatus of the type mentioned above whereby all the above described drawbacks can be eliminated.

The features and the advantages of the inventive apparatus will become apparent from the following detailed description of two non limiting embodiments thereof, wherein the first one uses, as temporary stop means, intermittent operation conveyor belts, while the second uses actual stop members.

Figure 1:
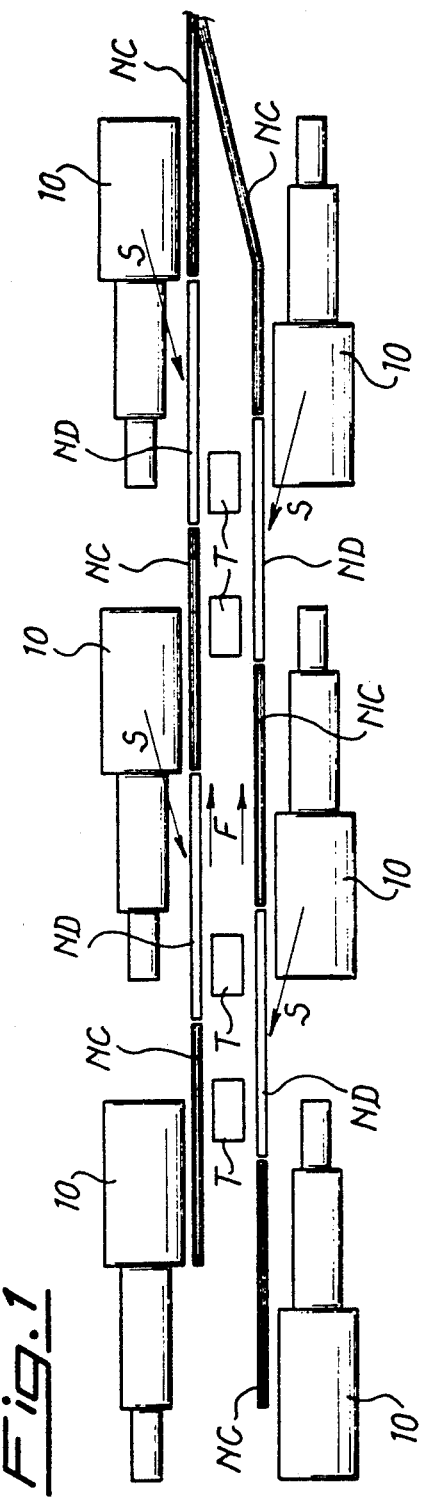
FIG. 1 is a schematic plan view of two lines of automatic machines, wherein each machine uses the inventive apparatus, in the first embodiment thereof.
Figure 2:
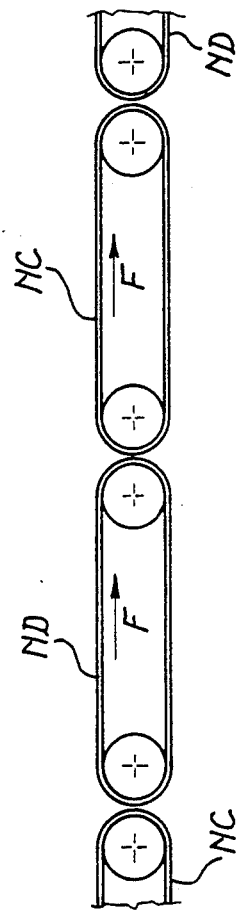
FIG. 2 is a schematic side elevational view of a part of one of the two lines of FIG. 1, to show the mutual layout of the conveyor belts.
Figure 3:
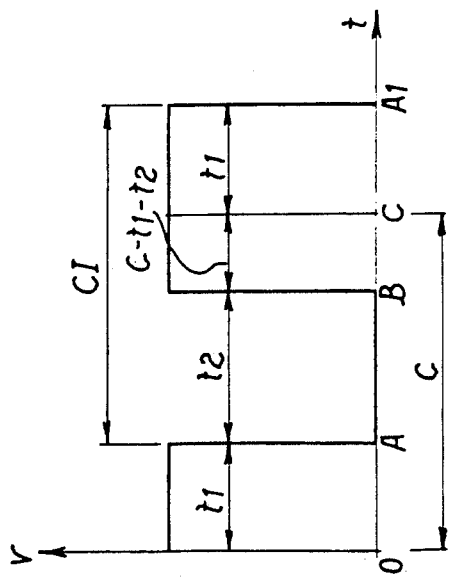
FIG. 3 is a diagram showing the cycle time of each intermittent operation conveyor belt, as a function of the machine cycle, of the delay time $t_1$ and of the stop time $t_2$.

Referring now in particular to FIGS. 1 to 3, the first embodiment is described in the following.

FIG. 1 shows a manufacturing layout where two lines of automatic machines are in operation, each one using the inventive apparatus. In any case, it should be understood that the innovation concept of this invention is valid also for the case of a single line of machines, as well as for plural lines.

Referring to the above Figure, the various automatic machines of each one of the two lines are shown with reference number 10. For exemplary and non limiting purposes only, reference may be made to the case of a line of presses for molding articles in a thermoplastic material.

Each line of automatic machines 10 has associated therewith a plurality of conveyor belts serially arranged relative to each other, whereby they comprise a single line of conveyor belts, on which the workpieces move from a conveyor belt to the next.

There are two different types of conveyor belts, following each other in an alternating sequence. In particular a first type of conveyor belt, shown with reference symbol NC, is a continuously operating conveyor belt, while a second type, shown at reference symbol ND, is an intermittently operating conveyor belt. As it is shown in FIG. 1, each continuously operating conveyor belt NC is followed by an intermittently operating conveyor belt ND. The continuously operating conveyor belts will be driven by any known means, not shown, like for instance a drive motor simultaneously connected to the plural continuously operating conveyor belts NC, for instance by means of belt and pulley transmissions, or the like.

The intermittently operating conveyor belts ND may be driven by their individual motor means in that each one of them has to be actuated independent from the other, or else, a single drive motor may advantageously be provided, which may be connected to a certain one of the intermittently operating conveyor belts ND rather than to another, for instance by means of friction couplings or the like. The drive means as well are not shown, in that they can be embodied in a number of different ways already known.

Further, the inventive apparatus includes, for each one of the intermittently operating conveyor belts ND, a timing arrangement T, shown schematically by a single block, which is adapted to stop the operation of the intermittently operating conveyor belt ND, for a predetermined time, as it will be explained in the following, and to allow operation to be resumed once the stop time has elapsed.

Each timing arrangement T includes two timers, for instance two electric timers, arranged in series to each other, whose actuation is performed by picking up and forwarding thereto a signal, diagrammatically shown by arrows S in FIG. 1, generated by the manufacturing machine located downstream of each intermittently operating conveyor belt ND, relative to the forward direction of the belts, shown by arrows F of FIG. 1. In the above mentioned example concerning presses for molding articles in thermoplastic materials said electric signal may be generated at the moment when the article is taken out of the press.

Assuming that the preceding intermittently operating conveyor belt ND is in motion, said signal actuates the first timer, which has been preset, in order to determine the moment when intermittently operating conveyor belt ND has to be stopped. This is more apparent when considering FIG. 3, showing a diagram of the velocity of one of the intermittently operating conveyor belts ND, versus time, which diagram has to be considered valid also for the remaining conveyor belts.

In particular, the first timer determines, relative to the origin of times shown on the abscissa, which origin corresponds to the time when the signal has been sent, the delay time OA of the stop of intermittently operated conveyor belt ND. In other words, intermittently operating conveyor belt ND is not stopped immediately when the following manufacturing machine takes out the workpiece, but with a delay which is in fact determined by the first timer.

When the above conveyor belt has been stopped, the second timer is actuated, which determines the time AB the intermittently operating conveyor belt ND has to be stopped, i.e. the time available to the just manufactured workpieces to get into position on the continuously operating conveyor belt NC without hitting other workpieces.

As it is shown in FIG. 3, once stop time AB has elasped intermittently operating conveyor belt ND is operated again for a time period $BA_1$ that has to elapse before the next stop command of intermittently operated conveyor belt ND.

With the above operating procedure it will be certainly prevented that the various workpieces being fed to continuously operating conveyor belt NC(i−1), during undesirable time intervals pass over to the following continuously operating conveyor belt NC(i) (by proceeding along the intermediate intermitttently operating conveyor belt ND(i−1)) with the risk that they hit just manufactured pieces, arriving on said continuously operating conveyor belt NC(i).

As it is apparent from FIG. 3, the overall cycle duration time for each conveyor belt, indicated by the reference CI, is given by time $AA_1$.

The innovating concept of the inventive apparatus is mainly, even though not exclusively, the fact that the cycle duration times CI of each intermittently operating conveyor belt ND are not equal to each other, but that does not have any negative influence on the operations of the apparatus. On the contrary, this feature has an extremely positive influence on apparatus operation, in that the cycles of the intermittently operating conveyor belts ND are correlated or made dependent upon the cycles of the automatic manufacturing machines 10, whereby not only the interference between the manufactured pieces will be avoided, but also a summing up of time errors as it used to take place in the conventional machines, as described above, will be prevented.

Finally, it may be noticed from FIG. 1 that automatic machines 10 of each line are in the number of three, and the continuously operating conveyor belts NC are also three, while there is only two intermittently operating conveyor belts ND. In general, if the number of manufacturing machines is n, there will be as many continuously operating conveyor belts NC, and n−1 intermittently operating conveyor belts ND. This is so because, downstream of the last continuously operating conveyor belts NC of each line there isn't a manufacturing machine, but only a workpiece collecting station, such as a stocking station.

From the description of the apparatus given above it is apparent that the length of the two types of conveyor belts used is immaterial.

It is conceivable, for instance, to have intermittently operating conveyor belts ND shorter than the continuously operating ones, NC, up to conceivably replacing the former with members having a length of few halfscores of millimeters, which shall be called "small bridges" herein, and will be capable, by means of the same signals of the apparatus described herein above, to become "passable" or "unpassable" to the workpieces, by means of a moving member included in the structure of the "small bridge" which, being controlled by the two timers may, according to the position thereof, cause the workpieces to be stopped or not.

Figure 4:
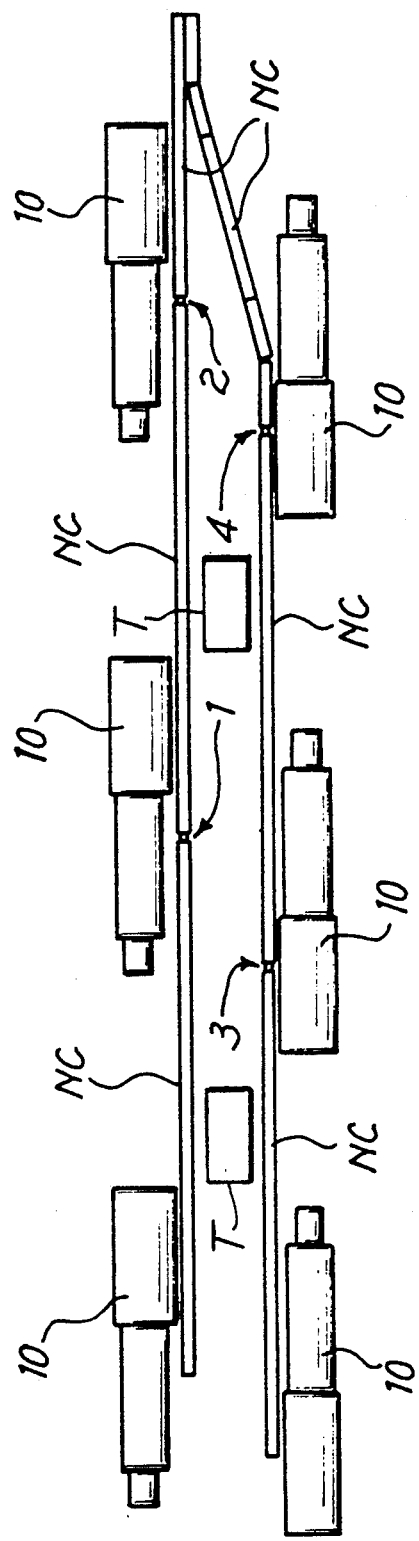
FIG. 4 is a plan view schematic of the embodimental variation.

Such a line provided with the "small bridges" as shown in FIG. 4 at 1, 2, 3 and 4, inserted between the continuously operating conveyor belts NC is completely equivalent, from any possible standpoint (functional and operational) to the one where the two types of conveyor belts are used, while being further simplified and even more cost effective. This approach, which is the second embodiment of the invention, will be described in the following referring to FIGS. 5 and 6, for one of the temporary stop means.

Figure 5:
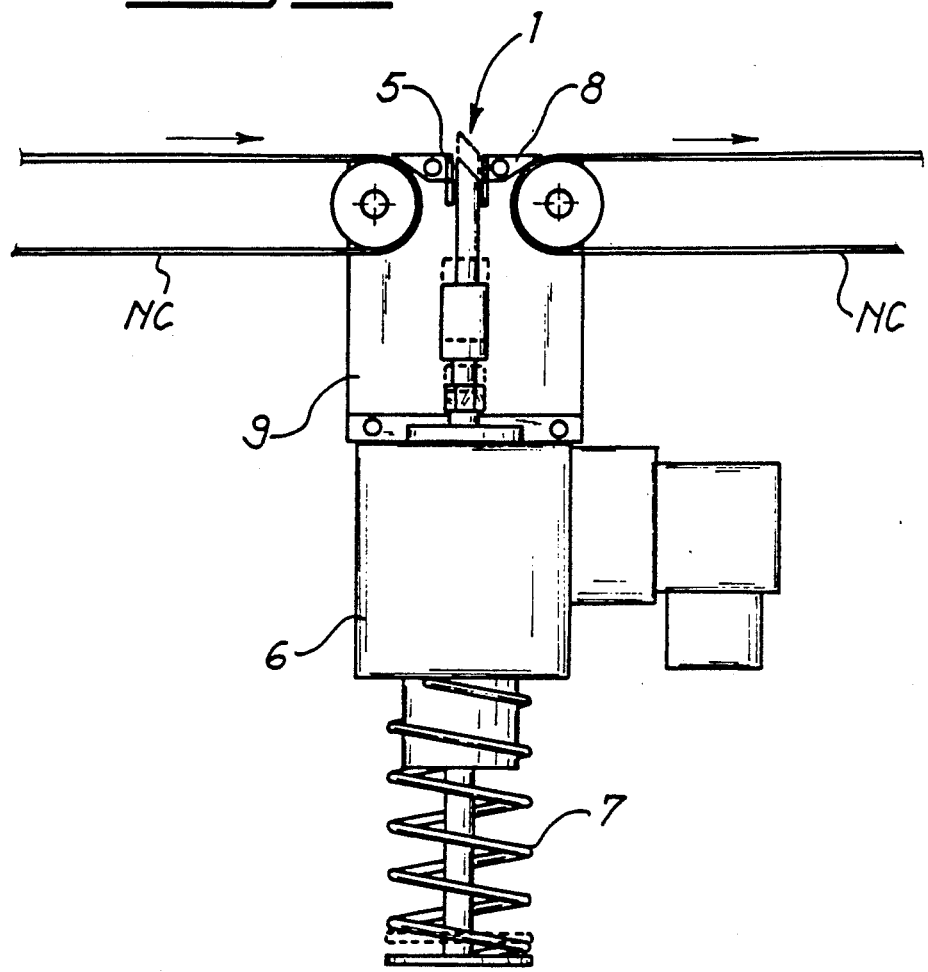
FIG. 5 is a longitudinal section view of one of the temporary stop means of the line shown in FIG. 4.

As it appears from FIG. 5, temporary stop means 1, the others being identical thereto, includes a stop member 5 movable between a disabled position (shown in solid lines) and an enabled position (shown in dashed lines). The displacements of member 5 are controlled by an electromagnet 6 provided with a return spring 7. Member 5 is slidably mounted relative to an opening in a sliding surface 8 carried, as well as electromagnet 6, by support means 9.

As it is shown the level of the sliding surface coincides with the plane of translation of the surface of continuously operated conveyor belts NC.

Figure 6:
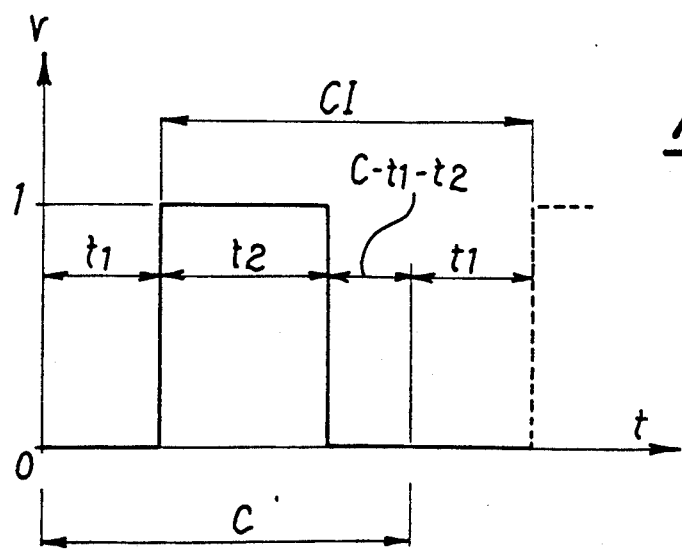
FIG. 6 is a diagram showing the actuating cycle of the means shown in FIG. 5.

Referring now to FIG. 6, in this case as well, the machine cycle duration time is shown at C, while stop member 5 cycle duration time is shown at CI. In FIG. 6:

$t_1$ is the enable delay time (first timer);
$t_2$ is the enable time (second timer);
$C - t_1 - t_2$ is the residual disable time.

It should be understood that variations and/or modifications may be made to the apparatus according to this invention while not exceeding the scope of protection of the invention.

What we claim is:

1. An apparatus for controlling the laying and transportation, on a line of conveyor belts, of indexed workpieces manufactured by a plurality of automatic machines, the line of conveyor belts comprising:
   a plurality of continuously operating conveyor belts; and
   means, associated with the conveyor belts, for temporarily stopping the workpieces;
   wherein the temporary stop means comprises:
       a sliding platform connecting a pair of continuously operating conveyor belts; and a stop member adapted to set out transverse to the direction of the workpiece forward motion.

2. The apparatus of claim 1, wherein the timing arrangement actuating signal corresponds to one of the characteristic signals of an automatic manufacturing machine.

3. The apparatus of claim 1, wherein each timing arrangement includes a pair of timers, arranged in series to each other, wherein the first timer, after receiving the actuating signal, determines the enable delay time of the temporary stop means associated therewith, while the second timer, once it has been actuated, determines the enable time of said temporary stop means.

4. The apparatus of claim 1, and further comprising a timing arrangement connected to the temporary stop means, the timing arrangement being actuated by a signal originating from one of the maufacturing machines, the timing arrangement being adapted to enable, at a given moment in time, the temporary stop means, and subsequently, to maintain the temporary stop means enabled for a predetermined time interval.

* * * * *